(12) United States Patent  (10) Patent No.: US 7,472,624 B2
Revelis et al.  (45) Date of Patent: Jan. 6, 2009

(54) PUSH TO RELEASE BRAKE ACTUATING ASSEMBLY FOR A VEHICLE

(75) Inventors: Peter Revelis, Newmarket (CA); Michael Sykes, Orangeville (CA); Jerry Zielinski, Oshawa (CA); Dusit Sukonthapanich, Newmarket (CA)

(73) Assignee: Ventra Group Inc., Ontario (CA)

( * ) Notice: Subject to any disclaimer, the term of this patent is extended or adjusted under 35 U.S.C. 154(b) by 937 days.

(21) Appl. No.: 10/885,506

(22) Filed: Jul. 7, 2004

(65) Prior Publication Data

US 2006/0053951 A1  Mar. 16, 2006

(51) Int. Cl.
G05G 5/06 (2006.01)
G05G 1/00 (2006.01)

(52) U.S. Cl. .............. 74/542; 74/512; 74/535; 74/575; 74/577 S; 74/578; 74/560

(58) Field of Classification Search ........... 74/512–516, 74/560, 535, 575, 577 S, 578, 577 M; 188/265, 188/79.54; 192/219.7; G05G 5/06
See application file for complete search history.

(56) References Cited

U.S. PATENT DOCUMENTS

| 3,236,120 | A |   | 2/1966 | Fender |
| 3,315,538 | A |   | 4/1967 | Fender |
| 3,358,797 | A |   | 12/1967 | Walton |
| 4,391,159 | A | * | 7/1983 | Sellmeyer ............. 74/516 |
| 4,421,214 | A | * | 12/1983 | Sellmeyer ............ 192/219.7 |
| 4,872,368 | A |   | 10/1989 | Porter |
| 5,217,094 | A |   | 6/1993 | Walter et al. |
| 5,546,828 | A |   | 8/1996 | Golarz |
| 5,588,335 | A | * | 12/1996 | Strait ................. 74/512 |
| 5,775,174 | A |   | 7/1998 | Kanbe et al. |
| 5,794,492 | A |   | 8/1998 | Pare' |
| 5,875,688 | A |   | 3/1999 | Porter et al. |
| 6,508,341 | B1 | * | 1/2003 | Hiura ................ 188/265 |
| 6,550,354 | B2 |   | 4/2003 | Kim |
| 7,051,614 | B2 | * | 5/2006 | Podkopayev .......... 74/512 |
| 2001/0003928 | A1 |   | 6/2001 | Kim |
| 2003/0094069 | A1 | * | 5/2003 | Kanbe ................ 74/560 |
| 2006/0053952 | A1 |   | 3/2006 | Fujioka et al. |
| 2008/0116022 | A1 | * | 5/2008 | Hanna et al. ........... 188/79.54 |

FOREIGN PATENT DOCUMENTS

EP  0 527 518 A1  2/1993

* cited by examiner

Primary Examiner—Vinh T. Luong
(74) Attorney, Agent, or Firm—Pillsbury Winthrop Shaw Pittman LLP (57) ABSTRACT

A brake actuating assembly for a vehicle having a brake system is provided. The assembly includes a mounting bracket for mounting the brake actuating assembly to the vehicle, and a pedal arm mounted to the mounting bracket for pivotal movement about a pivot axis. The pedal arm is connectable to the brake system such that movement of the pedal arm in a brake applying direction activates the brake system and movement of the pedal arm in a brake releasing direction de-activates the brake system. An arcuate rack of teeth is connected to the pedal arm, and a pawl that includes a tooth engages the rack. The assembly also includes a spring that has a first end that operatively connected to the pawl, and the second end that is operatively connected to the mounting bracket in an opening that includes a surface extending between a first stop and a second stop.

22 Claims, 8 Drawing Sheets

PUSH TO RELEASE BRAKE ACTUATING ASSEMBLY FOR A VEHICLE

BACKGROUND OF THE INVENTION

1. Field of the Invention

The present invention is generally related to brakes for vehicles and more particularly to a push to release brake actuating assembly for a vehicle.

2. Description of Related Art

A push to release brake actuating assembly is one type of parking brake actuator that is used in a variety of vehicles. Other types of parking brake actuators include a hand brake actuator that is typically mounted toward the center of the vehicle so that the operator of the vehicle may set and release the brake with one hand. This type of brake actuator typically includes a lever that is pulled upward by the operator to set the parking brake. A push button is typically disposed at a distal end of the lever and is pushed by the operator to disengage a locking pawl and allow the lever to be moved to disengage the parking brake.

Another type of parking brake actuator is mounted near the floor of the vehicle and includes a pedal that is designed to be engaged by the operator's foot when the operator decides to set the parking brake. A release handle is typically mounted above the pedal. This handle allows the operator to disengage the parking brake by pulling the release handle, which disengages a locking pawl to free the arm on which the pedal is mounted for movement in the brake releasing direction. Some vehicles that have this type of parking brake actuator also have an automatic parking brake release that includes a vacuum motor or servo that is operatively connected to the locking pawl. When the vehicle is running and the transmission is shifted into gear, a solenoid valve is actuated. The solenoid valve causes vacuum to be applied to the vacuum motor, which causes the locking pawl to release from the pedal arm, thereby moving the pedal in the brake releasing direction.

A push to release type brake actuator is also mounted near the floor of the vehicle and includes a pedal that is designed to be engaged by the operator's foot when the operator decides to set the parking brake. The operator disengages the parking brake by pushing the pedal a second time, which frees the pedal for movement to its original position. Issues that have been encountered with the conventional push to release brake actuator include backlash and operational reliability. Backlash is the load drop that occurs when the operator releases the parking brake actuator and has been attributed to the design of some of the internal components of the brake actuator. Operational reliability depends on the robustness of the push to release operation, which depends on the accuracy of many of the internal component parts of the brake, as well as the accuracy of the finished assembly.

In an effort to increase and maintain a high level of operational reliability, very tight tolerances are used when manufacturing the brake actuator assembly. However, these tight tolerances tend to contribute to high backlash. Also, consistently achieving the tight tolerances also increase the cost to manufacture the brake actuator assembly.

BRIEF SUMMARY OF THE INVENTION

In one embodiment of the present invention, a brake actuating assembly for use in a vehicle having a brake system is provided. The brake actuating assembly includes a mounting bracket for mounting the brake actuating assembly to the vehicle, and a pedal arm that is mounted to the mounting bracket for pivotal movement about a pivot axis. The pedal arm has a pedal pad on a distal end that is away from the pivot axis. The pedal pad is configured to be engaged by a person's foot. The pedal arm is connectable to the brake system of the vehicle such that movement of the pedal arm in a brake applying direction activates the brake system and movement of the pedal arm in a brake releasing direction de-activates the brake system. The brake system biases the pedal arm in the brake releasing direction. The assembly also includes an arcuate rack of teeth that is connected to the pedal arm, and a pawl that includes a tooth that is configured to engage the rack. The pawl is mounted for both (a) pivotal movements in engaging and disengaging directions and (b) translational shifting movements in setting and resetting directions.

The assembly further includes a spring that has a first end and a second end. The first end is operatively connected to the pawl, and the second end is operatively connected to the mounting bracket in an opening that includes a surface extending between a first stop and a second stop. The spring in a first orientation has the second end engaged with the first stop to bias the pawl to pivot in the engaging direction. The spring is arranged in its first orientation as the pedal arm is being moved from a fully released position in the brake applying direction, which biases the pawl in the engaging direction and maintains the tooth of the pawl in a ratcheting engagement with the teeth of the rack. The pawl shifts in the setting direction after ceasing movement of the pedal arm in the brake applying direction as a result of the pedal arm being biased in the brake releasing direction and applying force to the pawl in the setting direction by the engagement between the pawl and the teeth of the rack. The force that is applied to the pawl in the setting direction also maintains the engagement between the tooth of the pawl and the teeth of the rack to prevent movement of the pedal arm in the releasing direction. The spring is arranged such that the shifting of the pawl in the setting direction responsively causes the spring to move to a second orientation with the second end engaged with the second stop. The spring in the second orientation biases the pawl in the disengaging direction such that further movement of the pedal arm in the brake applying direction enables the tooth of the pawl to disengage from the teeth of the rack for movement of the pawl in the disengaging direction. This enables the pedal arm to move in the brake releasing direction to the fully released position. The pawl responsively shifts back in the resetting direction and the spring responsively moves back to the first orientation to bias the pawl to pivot in the engaging direction as the pedal arm moves to the fully released position.

These and other aspects of the invention will become apparent from the following detailed description when taken in conjunction with the accompanying drawings, which are part of this disclosure and which illustrate, by way of example, the principles of this invention.

BRIEF DESCRIPTION OF THE DRAWINGS

Features of the invention are shown in the drawings, in which like reference numerals designate like elements. The drawings form part of this original disclosure, in which.

DETAILED DESCRIPTION OF EMBODIMENTS OF THE INVENTION

Figure 1:
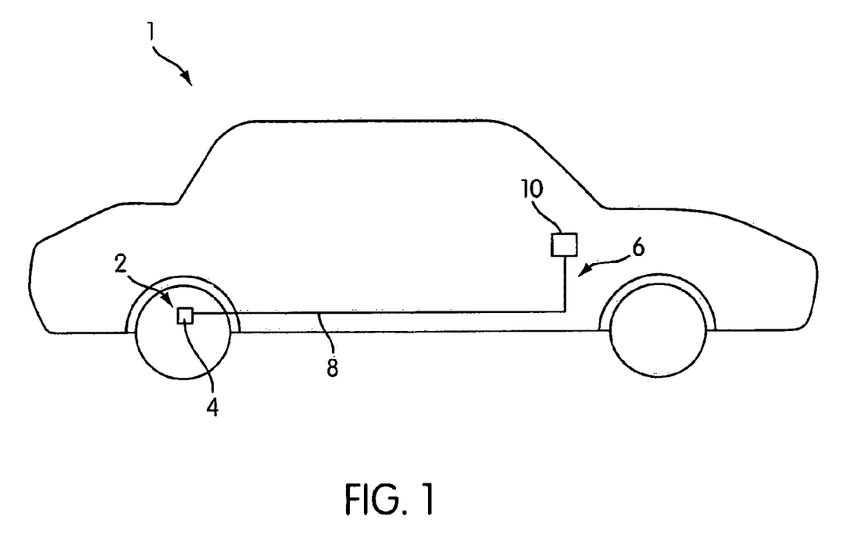
FIG. 1 is a schematic view of a vehicle with a braking system and a brake actuating assembly of the present invention.

FIG. 1 generally shows a vehicle 1 with a brake system 2. The brake system 2 may be any known type of brake system, and may include disc brakes, drum brakes, or any other type of brake that is commonly used in vehicles. As shown, the brake system 2 includes a rear brake 4. It is understood that although only the right side of the vehicle 1 is shown, a rear brake 4 may also be disposed on a left side of the vehicle 1 in a like manner. Although the rear brake 4 is typically actuated by the operator of the vehicle 1 via a hydraulic system (not shown), it is common for vehicles to also be equipped with an emergency brake system 6 that allows mechanical actuation of the rear brake 4 in the event that the hydraulic system fails during operation of the vehicle 1. The emergency brake system 6 may also be used as a "parking brake" that may be used to actuate the rear brake 4 even when the vehicle 1 is not being operated. Instead of relying on the hydraulic system, the emergency/parking brake system 6 includes a cable 8 that is connected at one end to the rear brake 4 of the vehicle 1 and at the other end to a brake actuating assembly 10. It is contemplated that the brake actuating assembly 10 may be used with brake systems 2 that have either manual adjust mechanisms or self-adjust mechanisms.

Figure 2:
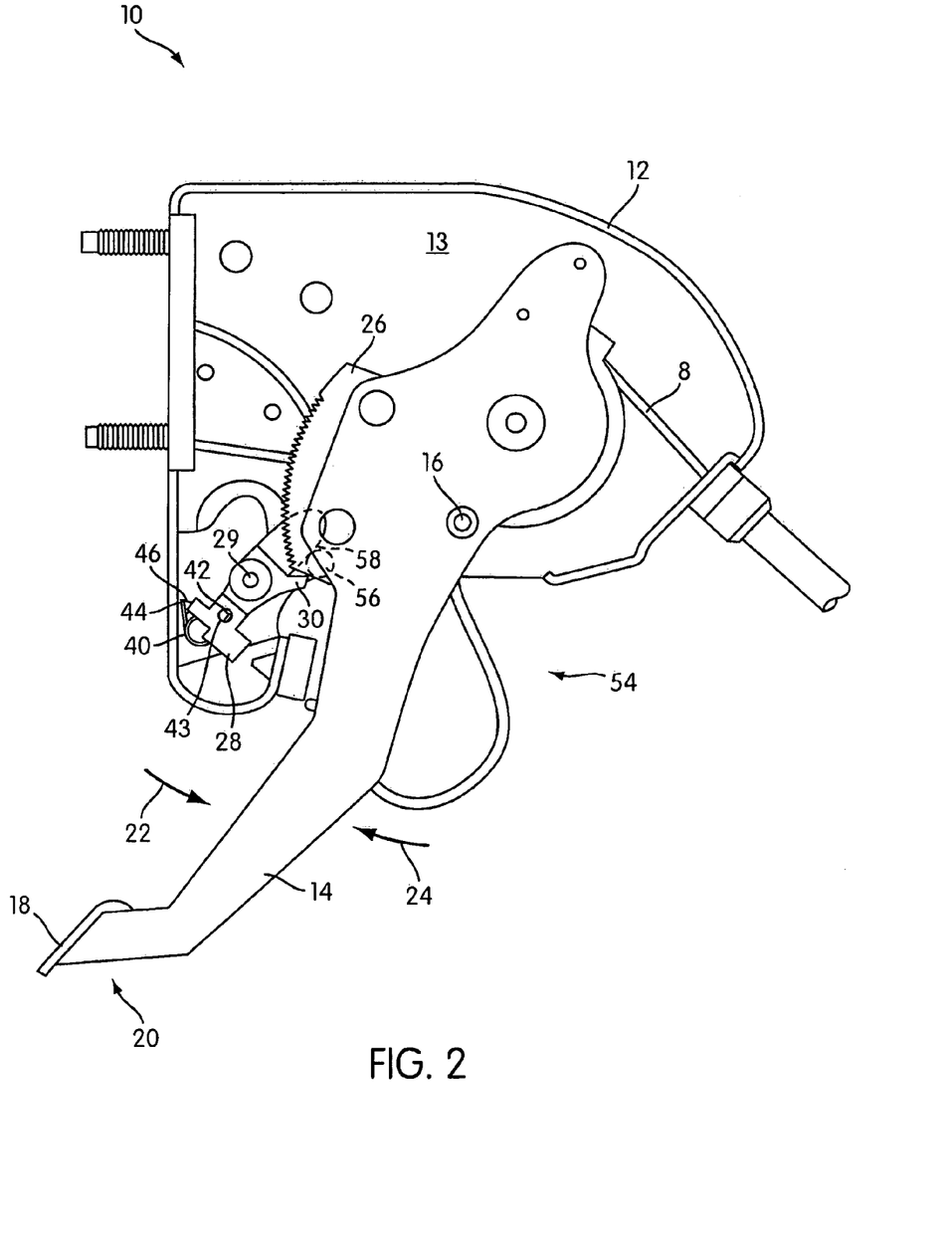
FIG. 2 is a side view of the brake actuating assembly of the present invention, with a pedal arm of the brake actuating assembly in a fully released position.

FIG. 2 shows the brake actuating assembly 10 in greater detail. The brake actuating assembly 10 includes a mounting bracket 12 for mounting the brake actuating assembly 10 to the vehicle 1. The brake actuating assembly 10 is mounted to the vehicle 1 by known methods at a location near the other pedals (not shown) that are typically used by the operator to affect movement of the vehicle 1, such as an accelerator pedal, a brake pedal, and a clutch. For example, the brake actuating assembly 10 may be mounted such that it sits forward, downward, and to the left of the operator when the operator is facing forward in the driver's seat of the vehicle 1. In such a position, the operator may operate the brake actuating assembly 10 with a foot, yet the brake actuating assembly 10 does not interfere with the normal operation of the vehicle 1.

The mounting bracket 12 may be constructed from any suitable material, including but not limited to metal. Preferably, the mounting bracket 12 is formed from steel. The shape of the mounting bracket 12 is largely dictated by the size and configuration of the internal components of the brake actuating assembly 10. It is understood that the mounting bracket 12 may include a plurality of pieces that are connected by known methods (e.g., welding, fasteners, etc.) to form one unit. Also, internal structural components that are mounted to an outer shell 13 of the mounting bracket 12 are considered to be part of the mounting bracket 12 and details of such components are not illustrated here for clarity. The outer shell 13 of the mounting bracket is preferably designed to substantially enclose the internal parts of the assembly 10. A portion of the outer shell 13 of the mounting bracket 12 is removed in the figures so that the internal parts may be shown.

The assembly 10 also includes a pedal arm 14 that is pivotally mounted to the mounting bracket 12 so that it may move relative to the mounting bracket 12. The pedal arm 14 pivots about a pivot axis 16 and is preferably mounted to the mounting bracket 12 at the pivot axis 16. The pedal arm 14 is preferably constructed of metal, but may also be molded from an engineered plastic or made from any other material that can withstand both the forces being applied to the pedal arm 14 during operation, and the frequency of the forces being applied to the pedal arm 14 over the lifetime of the vehicle 1. The pedal arm 14 has a pedal pad 18 on a distal end 20 that is away from the pivot axis 16. The pedal pad 18 is configured to be engaged by a person's foot. The pedal pad 18 is preferably covered with an anti-slip material such as textured rubber or the like. The pedal pad 18 may be an integral part of the pedal arm 14 and may include texturing so as to provide a non-slip surface for the person's foot to engage, or the pedal pad 18 may be a separate piece that is connected to the distal end 20 by known methods. It is contemplated that the pedal arm 14 and the pedal pad 18 may have any suitable configuration and the illustrated embodiment is not intended to be limiting in any way.

Figure 3:
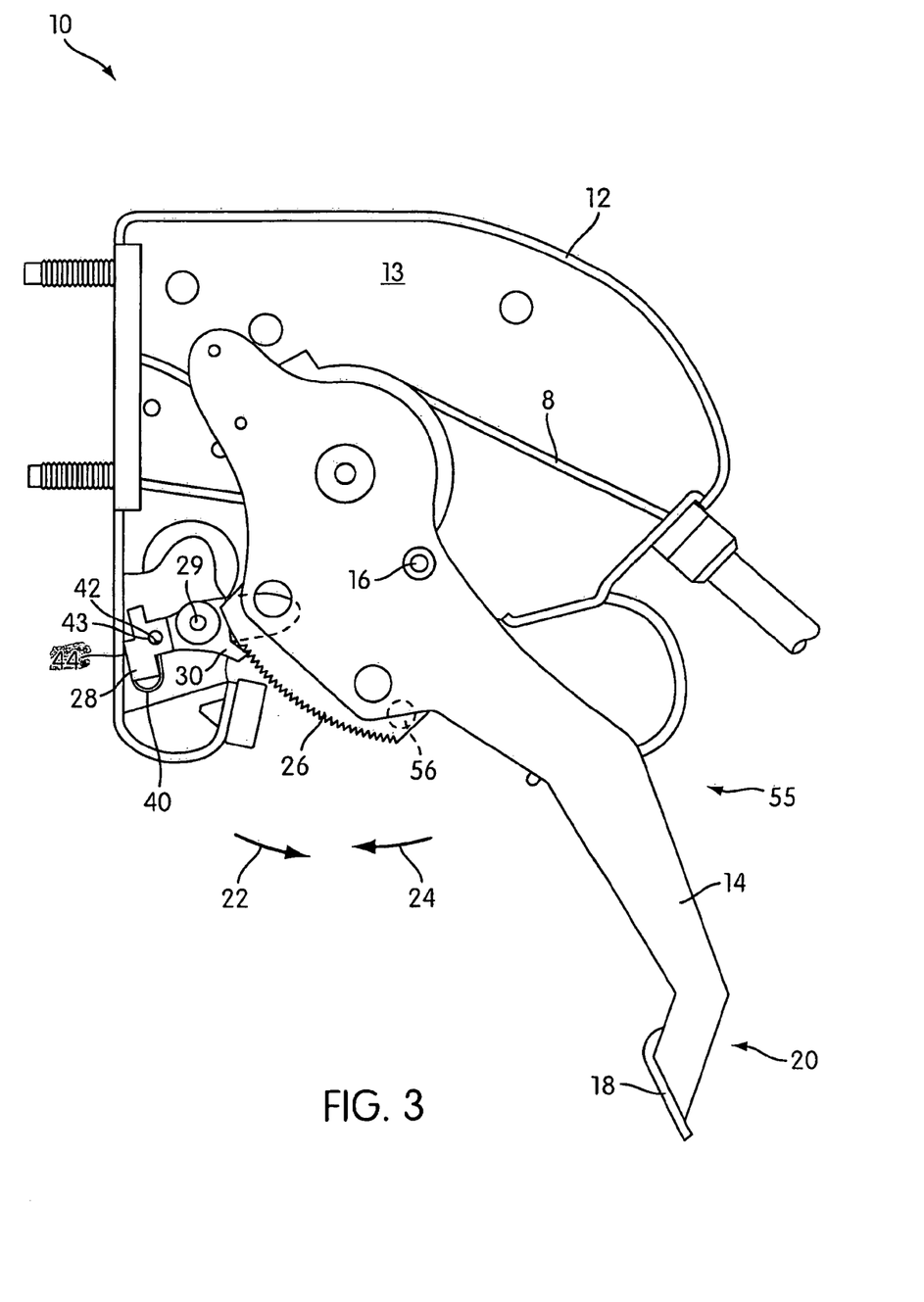
FIG. 3 is a side view of the brake actuating assembly of FIG. 2, with the brake actuating assembly in an engaged position.

FIG. 2 shows the pedal arm 14 in a fully released position 54, and FIG. 3 shows the pedal arm 14 in a fully engaged position 55. The fully released position 54 is a position at which the brake actuating assembly 10 is normally located and in this position, it does not actuate the brake system 2. In this position, the rear brake 4 is biased to a disengaged position. Such biasing is typically provided by at least one biasing member, such as a spring, that positions the rear brake 4 away from the wheel of the vehicle 1 so that the rear brake 4 is disengaged. The biasing force provided by the biasing member also translates through the brake cable 8 to the brake actuating assembly 10 such that it biases the pedal arm 14 towards the fully released position 54.

The fully engaged position 55 is realized when the pedal arm 14 is pushed to the maximum extent allowed, and in this position the brake actuating assembly 10 has fully actuated the brake system 2. The pedal arm 14 is connectable to the brake system 2 of the vehicle 1 via a reel or cam 21, which is attached to the cable 8 such that movement of the pedal arm 14 in a brake applying direction 22 increases the tension in the cable 8, which overcomes the biasing of the biasing member at the rear brake 4, thereby allowing actuation of the rear brake 4. Conversely, movement of the pedal arm 14 in a brake releasing direction 24 de-activates the brake system 2 by decreasing the tension in the cable 8, which allows the rear brake 4 to be biased to disengage from the wheel of the vehicle 1. The brake applying direction 22, shown in FIGS. 2 and 3, is the direction toward the fully engaged position 55, and the brake releasing direction 24 is the direction toward the fully released position 54.

An arcuate rack of teeth 26 is connected to the pedal arm 14 and moves with the pedal arm 14. The rack of teeth 26 may be a separate part that is rigidly connected to the pedal arm 14, or the rack of teeth 26 may be integral with the pedal arm 14. The curvature of the rack of teeth 26 is determined by the distance of the teeth from the pivot axis 16 so that individual teeth may travel along the same path as the pedal arm 14 rotates. This curvature may have a consistent radius centered at pivot axis 16. This allows for ratcheting of the pedal arm 14 as the pedal arm 14 moves in the brake applying direction 22. The rack of teeth 26 is preferably made from steel or any stiff metal or other material that can withstand the repetitive forces being applied to the teeth of the rack 26.

Figure 4:
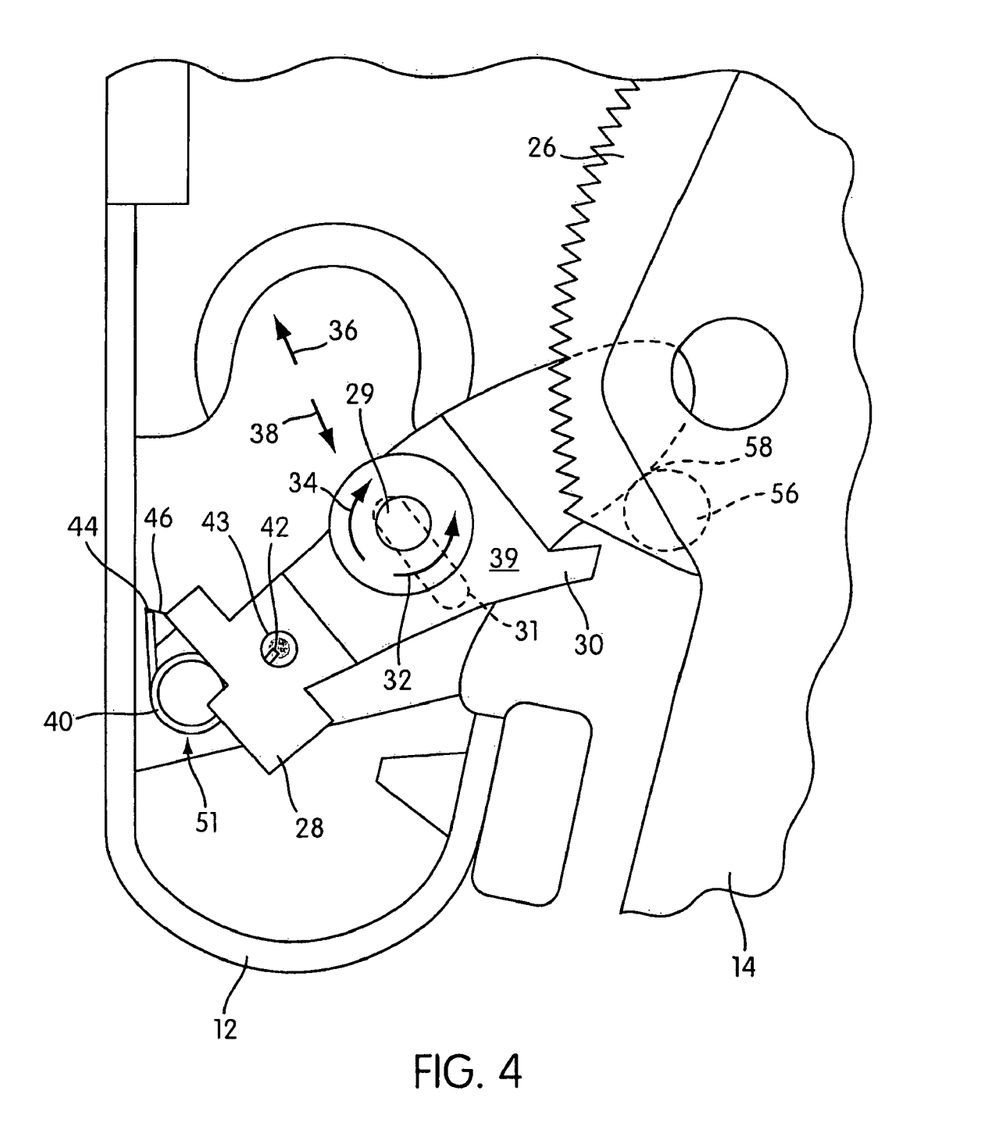
FIG. 4 is a detailed side view of a pawl of the brake actuating assembly in the released position of FIG. 2.
Figure 5:
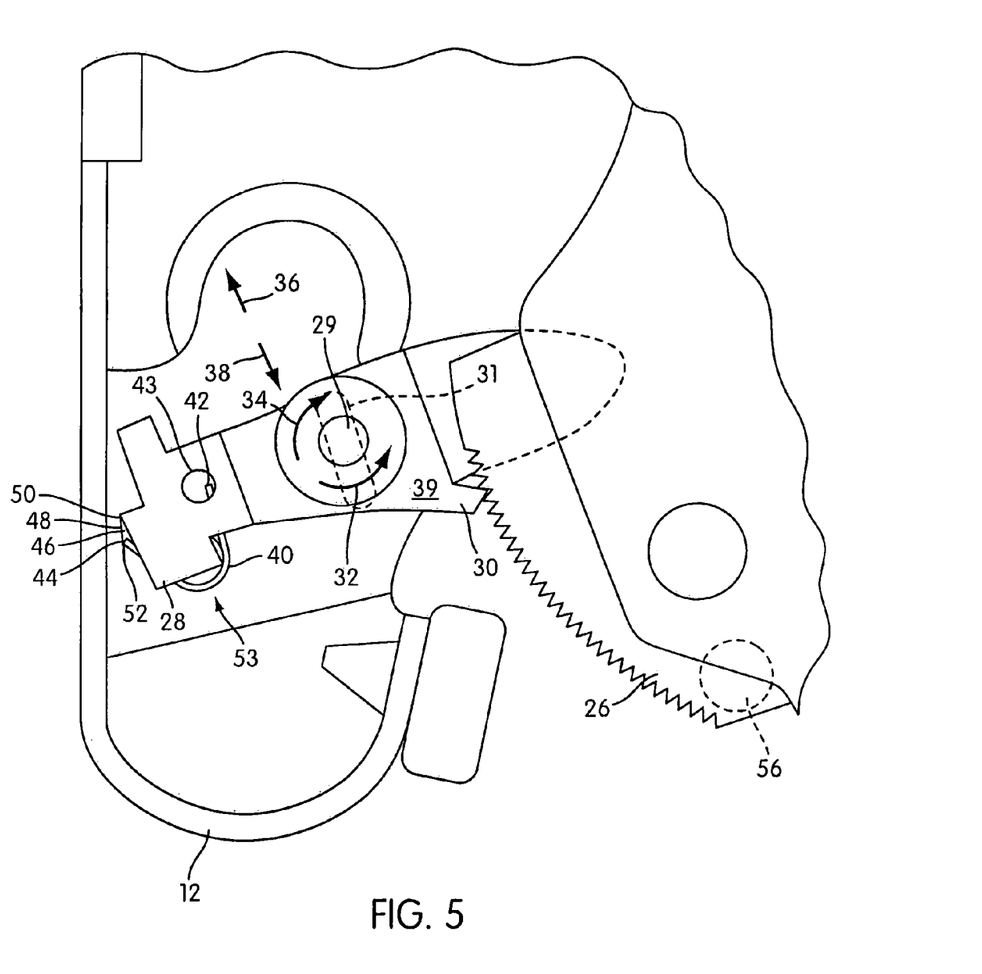
FIG. 5 is a detailed side view of the pawl of the brake actuating assembly in the engaged position of FIG. 3.

As shown in greater detail in FIGS. 4 and 5, a pawl 28 is operatively connected to the mounting bracket 12 at a pawl pivot axis 29. The pawl 28 includes at least one tooth 30 that is configured to engage the rack 26. Although the figures show the pawl 28 with only one tooth 30, the pawl 28 may have a plurality of teeth. Thus, the illustrated embodiment is not intended to be limiting in any way. The pawl 28 is mounted to the mounting bracket 12 at a position that allows the pawl 28 to engage the rack 26 as the rack 26 rotates about the pivot axis 16, thereby providing the ratcheting action. The pawl 28 includes a slot 31 and is mounted at the pivot axis 29 for pivotal movements in engaging and disengaging directions 32, 34, as well as translational shifting movements in setting and resetting directions 36, 38, which will be discussed in further detail below.

The pawl 28 includes a raised portion 39 and, as shown in the figures, the tooth 30 is part of the raised portion 39. The raised portion 39 via the tooth 30 engages the rack of teeth 26, while another portion of the pawl 28 is configured to extend in a space between the rack 26 and the mounting bracket 12. Preferably, the pawl 28 is made from metal, such as steel, and may be manufactured from powder metal.

Figure 6:
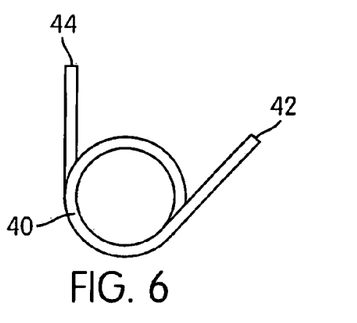
FIG. 6 is a top view of a torsion spring of the brake actuating assembly.
Figure 7A:
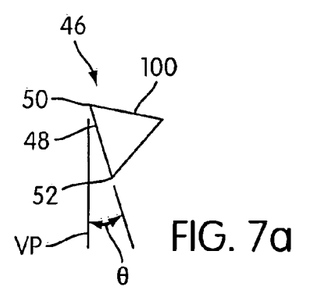
FIGS. 7a-7f are schematic views of various geometries of an opening within the brake actuating assembly of FIG. 2.
Figure 7B:
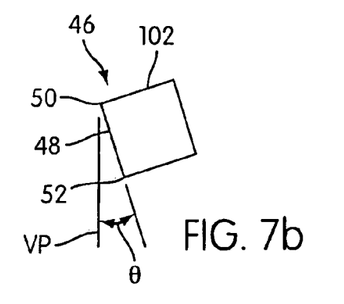
Figure 7C:
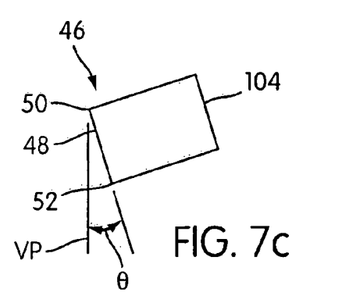
Figure 7D:
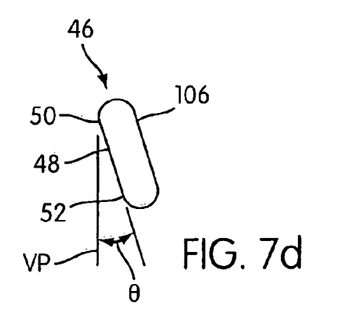
Figure 7E:
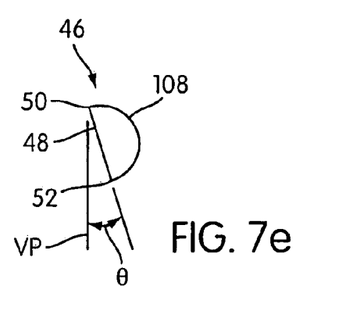
Figure 7F:
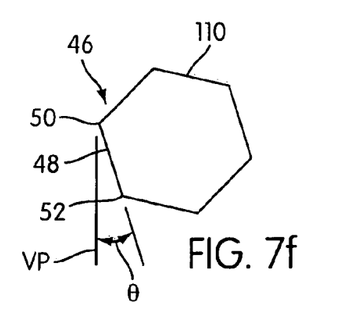

As shown in FIG. 6, a spring 40 that has a first end 42 and a second end 44 is also provided. The spring 40 is preferably a torsion spring made from steel or spring steel, and is sized to provide the requisite resistance as required by the overall design of the assembly 10. Generally speaking, the spring 40 may have any suitable configuration and may be made from any suitable resilient material, and the illustrated and described embodiment is not intended to be limiting in any way.

Returning to FIGS. 4 and 5, the first end 42 of the spring 40 is operatively connected to the pawl 28 in an opening 43, and the second end 44 of the spring 40 is operatively connected to the mounting bracket 12 in an opening 46. As would be understood by one of ordinary skill in the art, the opening 46 may be located on the portion of the outer shell 13 that is not shown in the figures, or may be located in any part that is operatively connected to the mounting bracket 12. The pawl opening 43 is preferably of a circular shape and is sized so that the first end 42 of the spring 40 is able to move within the opening 43. Of course, the pawl opening 43 may be of any shape and is not limited to a circle.

The opening 46 in the mounting bracket 12 includes a surface 48 that extends between a first stop 50 and a second stop 52. The opening 46 may be of any shape. For example, the opening 46 may be a triangle 100, shown in greater detail in FIG. 6a, a square 102, as shown in FIG. 6b, a rectangle 104, as shown in FIG. 6c, a slot 106, as shown in FIG. 6d, a semi-circle 108, as shown in FIG. 6e, or a polygon 110, as shown in FIG. 6f. As shown in the figures, the surface 48 is disposed at an angle θ relative to a vertical plane VP that is also parallel to the pawl's pivot axis 29. The angle θ may be dependent on one or more factors relating to the design of the assembly 10. Specifically, the angle θ may be dependent on the coefficient of friction between the spring 40 material and the surface 48, the positioning of the opening 43 in the pawl 28, the length of the slot 31 in the pawl 28, as well as the overall design of the spring 40 (size, spring constant, etc.).

The pawl opening 43 and the mounting bracket opening 46 are arranged so as to allow movement of the spring 40 into at least two distinct orientations as the pawl 28 moves relative to the pivot axis 16. The position of the first end 42 of the spring 40 is determined by the position of the pawl 28, and hence pawl opening 43 relative to the pawl pivot axis 29. It is the positioning of the ends 42, 44 of the spring 40 relative to one another that determines which end of the surface 48 the second end 44 of the spring 40 contacts.

As shown in FIG. 4, the spring 40 has a first orientation 51 in which the second end 44 is engaged with the first stop 50 to bias the pawl 28 to pivot in the engaging direction 32. The spring 40 is arranged in its first orientation 51 as the pedal arm 14 is being moved in the brake applying direction 22 from a fully released position 54. This orientation biases the pawl 28 in the engaging direction 32 and maintains the tooth 30 of the pawl 28 in ratcheting engagement with the teeth of the rack 26.

After the pedal arm 14 ceases to be moved in the brake applying direction 22, the pedal arm 14 is biased by the brake system 2 in the brake releasing direction 24 and applies a force to the pawl 28 in the setting direction 36 by the engagement between the pawl 28 and the teeth of the rack 26. This causes the pawl 28 to shift along the slot 31 in the setting direction 36. This is referred to as the "setting" direction 36 because, as will be discussed below, this movement sets the pawl 28 for the push to release action described below. The force that is applied to the pawl 28 in the setting direction 36 also allows for a binding engagement between the tooth 30 of the pawl 28 and the teeth of the rack 26 to be maintained, which prevents movement of the pedal arm 14 in the brake releasing direction 24.

The spring 40 is arranged such that the shifting of the pawl 28 along the slot 31 in the setting direction 36 responsively causes the spring 40 to move to a second orientation 53 in which the second end 44 is engaged with the second stop 52, as shown in FIG. 5. When the spring 40 is in the second orientation 53, it biases the pawl 28 in the disengaging direction 34 such that further movement of the pedal arm 14 in the brake applying direction 22 enables the tooth 30 of the pawl 28 to disengage from the teeth of the rack 26 for movement of the pawl 28 in the disengaging direction 34. This enables the pedal arm 14 to move in the brake releasing direction 24 to the fully released position 54 under the bias of the brake system 2. This is the push to release action, as a slight pushing movement of the pedal arm 14 in the brake applying direction 22 will cause the disengagement of the pawl 28, and the biasing of the brake system 2 can pivot the pedal arm 14 back to its fully released position 54. It is not until the pedal arm 14 is pushed this second time that the brake system 2 will be disengaged, as the binding engagement between the tooth 30 of the pawl 28 and the teeth of the rack 26 will prevent the pedal arm 14 from returning to the fully released position 54 and allowing the brake system 2 to disengage the rear brake 4 from the wheel of the vehicle 1.

As the pedal arm 14 moves to the fully released position 54, a stop 56 that is operatively connected to the pedal arm 14 and, as shown, extends perpendicularly from a side of the rack of teeth 26, relative to the teeth, engages a surface 58 of the pawl 28, as shown in FIGS. 2 and 4, and causes the pawl 28 to first rotate in the engaging direction 32 and then shift back along the slot 31 in the resetting direction 38. This movement of the pawl 28 causes the spring 40 to responsively move back to the first orientation 51 which biases the pawl 28 to pivot in the engaging direction 32 as the pedal arm 14 moves to the fully released position 54.

The stop 56 may be integrally formed with the rack of teeth 26, it may be a separate piece that is mounted to the rack of teeth 26, or it may be separate from the rack of teeth 26, as long as it is operatively connected to the pedal arm 14. Also, the stop 56 may directly engage the surface 58 of the pawl 28, or may engage another interim part (not shown) that engages the pawl 28 so as to cause the pawl 28 to move, as described above.

The movement of the spring 40 through a full cycle of brake engagement and disengagement is illustrated schematically in FIGS. 8-13. Specifically, the first end 42 and the second end 44 of the spring 40 are shown in positions relative to the pawl pivot axis 29 as the pedal arm 14 is moved in the brake applying direction 22 from the fully released position 54 to the fully engaged position 55, and back to the fully released position 54. A pair of spring force vectors 60, 61 that represent the directions of forces exerted by the ends 42, 44 of the spring 40 on the pawl 28 and the mounting bracket 12, respectively, are shown to move as the ends 42, 44 of the spring 40 move relative to one another. Also illustrated are the surface 48 of the opening 46, and the first and second stops 50, 52 at either end of the surface 48. A first neutral axis 62 is shown and is defined as the axis that extends between the first stop 50 and the pawl pivot axis 29 and a second neutral axis 64 is shown and is defined as the axis that extends between the second stop 52 and the pawl pivot axis 29. The pawl 28 and slot 31 are shown in phantom.

Figure 8:
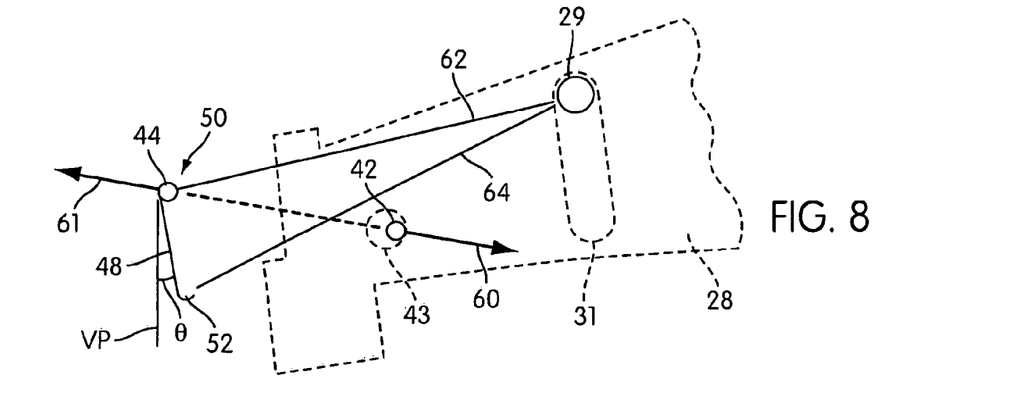
FIG. 8 is a schematic view showing the position of a spring relative to a pawl pivot axis when the pedal arm of the brake actuating assembly is in the fully released position of FIG. 2, and as pressure is applied to the pedal arm.

FIG. 8 shows the orientation of the first 42 and second 44 ends of the spring 40 when the pedal arm 14 is in the fully released position 54 and as it is being moved in the brake applying direction 22. As discussed above, the second end 44 of the spring 40 is located at the first stop 50. As pressure is applied to the pedal pad 18 by the operator of the vehicle 1, the pawl 28 is allowed to rotate about the pawl pivot axis 29 in a clockwise direction, as the spring 40 biases the pawl 28 in a counterclockwise direction. This creates a ratcheting action between the pawl 28 and rack of teeth 26.

Figure 9:
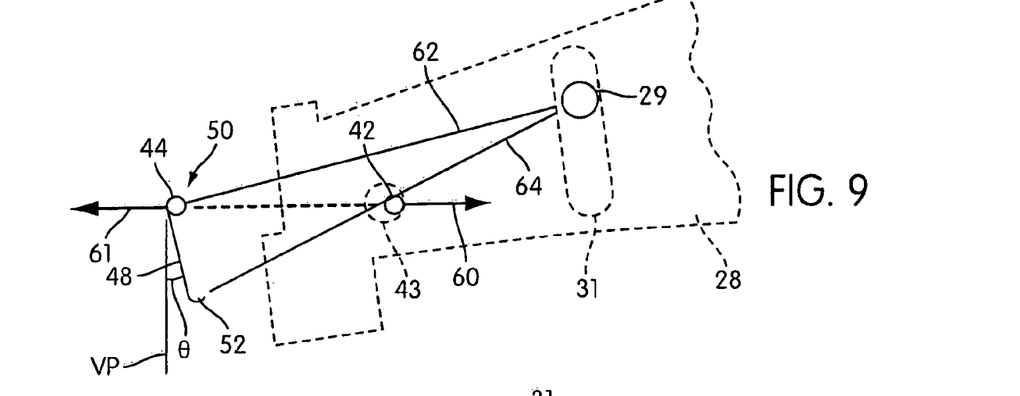
FIG. 9 is a schematic view showing the position of the spring relative to the pawl pivot axis of FIG. 8 when the pressure being applied to the pedal arm is reduced.

As the pressure that is applied to the pedal pad 18 is decreased to below a predetermined level or removed entirely, the biasing force of the braking system 2 causes the pedal arm 14 to move slightly in the brake releasing direction 24. As shown in FIG. 9, this causes the pawl 28 to translate along the slot 31 in the setting direction 36, which is substantially perpendicular to the pivot axis 29. This will in turn cause the first end 42 of the spring 40 to move across the second neutral axis 64, as shown in FIG. 9.

Figure 10:
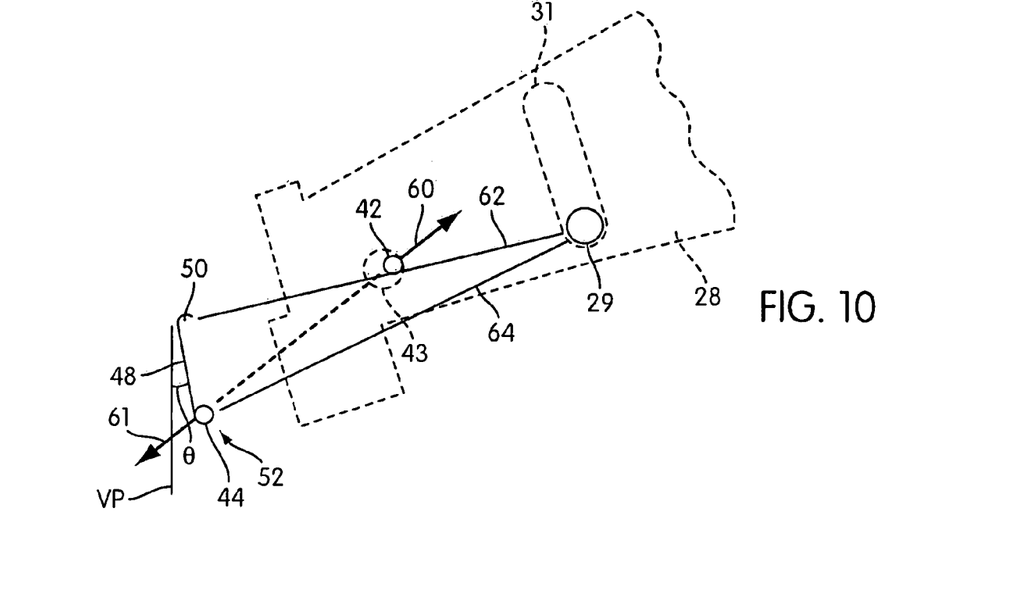
FIG. 10 is a schematic view showing the position of the spring relative to the pawl pivot axis of FIG. 8 when pressure is completely removed from the pedal arm after being moved to an engaged position.

As shown in FIG. 10, as the first end 42 of the spring 40 crosses over the first neutral axis 62, the force exerted on the surface 48 by the second end 44 of the spring 40, as illustrated by force vector 61, causes the second end 44 of the spring 40 to move along the surface 48 from the first stop 50 to the second stop 52 so that the spring 40 is now in its second orientation 53. Preferably, the location and orientation of the surface 48 is such that the first end 42 of the spring 40 crosses over the first neutral axis 62 just before the pawl 28 completes the translational movement relative to the pawl pivot axis 29 along the slot 31 in the setting direction 36. Although the tooth 30 on the pawl 28 is fully engaged with the rack of teeth 26 at this stage, this second orientation 53 of the spring 40 allows the pawl 28 to fully disengage from the rack of teeth 26 when the operator of the vehicle 1 presses the pedal pad 18 a second time to disengage the brake system 2.

Figure 11:
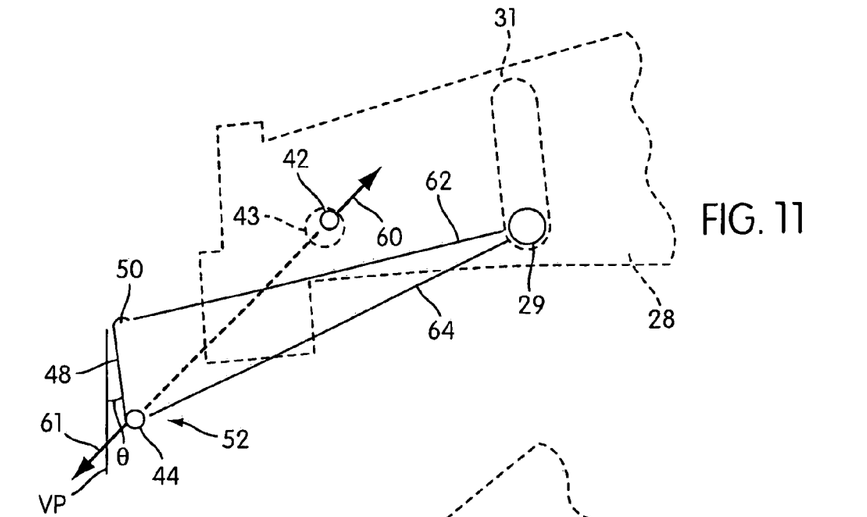
FIG. 11 is a schematic view showing the position of the spring relative to the pawl pivot axis of FIG. 8 when pressure is reapplied to the pedal arm.

When pressure is re-applied to the pedal pad 18, the new orientation of the pawl 28 allows the tooth 30 of the pawl 28 to disengage from the rack of teeth 26. As shown in FIG. 11, because of the orientation of the spring 40 and the force exerted by the first end 42 of the spring 40 on the pawl 28, as indicated by the force vector 60, the pawl 28 rotates about its pivot axis 29 in the disengaging direction 34, thereby causing the second end 42 of the spring 40 to move even further from the first neutral axis 62 and also allowing the pedal arm 14 to be biased by the braking system 2 toward the fully released position 54.

Figure 12:
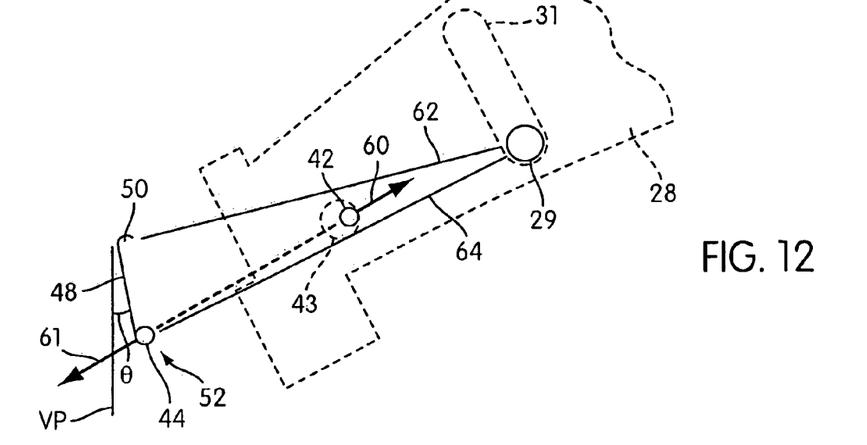
FIG. 12 is a schematic view showing the position of the spring relative to the pawl pivot axis of FIG. 8 when a stop on the pedal arm engages the pawl.
Figure 13:
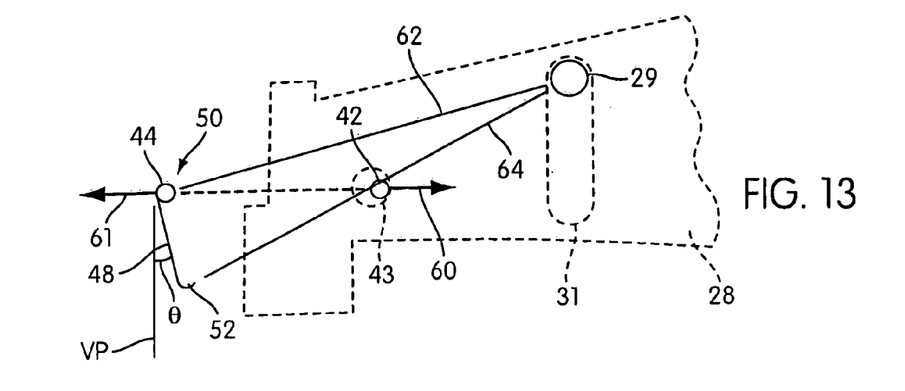
FIG. 13 is a schematic view showing the position of the spring relative to the pawl pivot axis of FIG. 8 when the pedal arm continues to move toward the fully released position.

As the pedal arm 14 approaches the fully released position 54, the stop 56 that extends perpendicularly from the surface of the rack of teeth 26 engages the pawl 28 at the surface 58 so as to rotate the pawl 28 in the engaging (counterclockwise) direction 32 against the force of the spring 40, due to the greater biasing force provided by the brake system 2. This causes the first end 42 of the spring 40 to move back across the first neutral axis 62, as shown in FIG. 12, and then across the second neutral axis 64, as shown in FIG. 13. The movement of the first end 42 of the spring 40 across the second neutral axis 64 orients the force exerted on the surface 48 by the second end 44 of the spring 40 in a direction that causes the second end 44 of the spring 40 to move along the surface 48 to the first stop 50. This movement also causes the spring 40 to reorient itself into the first orientation 51. This will in turn cause the pawl 28 to move along the slot 31 in the resetting direction 38. The pedal arm 14 returns to the fully released position 54 such that the ends 42, 44 of the spring 40 are re-oriented to the position shown in FIG. 8.

As one of skill in the art will appreciate, allowing the second end 44 of the spring 40 to move along a discrete surface 48 provides a more effective and efficient operation of the pawl 28 as compared to a system in which the ends of the spring are fixed. Such an arrangement also provides a push to release brake actuator with reduced backlash, without the need for relatively tight tolerances.

Although the pedal arm 14 that is shown and described is a foot pedal, it is understood that the pedal arm 14 may be replaced with a hand lever, and the arrangement of the pawl 28, the rack of teeth 26, and the spring 40 may be used with a pull to release hand brake in a similar manner.

While preferred embodiments of the invention have been shown and described, it is evident that variations and modifications are possible that are within the spirit and scope of the preferred embodiments described herein. The disclosed embodiments have been provided solely to illustrate the principles of the invention and should not be considered limiting in any way.

What is claimed is:

1. A brake actuating assembly for use in a vehicle having a brake system, the brake actuating assembly comprising:
   a mounting bracket for mounting the brake actuating assembly to the vehicle;
   a pedal arm mounted to the mounting bracket for pivotal movement about a pivot axis, the pedal arm having a pedal pad on a distal end thereof away from the pivot axis, the pedal pad being configured to be engaged by a person's foot,
   the pedal arm constructed and arranged to be connected to the brake system of the vehicle such that movement of the pedal arm in a brake applying direction activates the brake system and movement of the pedal arm in a brake releasing direction de-activates the brake system, with the brake system biasing the pedal arm in the brake releasing direction;

an arcuate rack of teeth connected to the pedal arm;

a pawl including a single tooth that is configured to engage the rack, the pawl being mounted for both (a) pivotal movements in engaging and disengaging directions and (b) translational shifting movements in setting and resetting directions; and a spring having a first end and a second end, the first end being operatively connected to the pawl, and the second end being operatively connected to the mounting bracket in an opening that includes a surface extending between a first stop and a second stop, wherein the spring is arranged such that in a first orientation the spring has the second end engaged with the first stop to bias the pawl to pivot in the engaging direction, and wherein the spring is arranged in its first orientation as the pedal arm is being moved from a fully released position in the brake applying direction to thereby bias the pawl in the engaging direction and maintain the tooth of the pawl in a ratcheting engagement with the teeth of the rack;

wherein the pawl is arranged to shift in the setting direction after ceasing movement of the pedal arm in the brake applying direction as a result of the pedal arm being biased in the brake releasing direction and applying force to the pawl in the setting direction by the engagement between the pawl and the teeth of the rack, the force being applied to the pawl in the setting direction also maintaining the engagement between the tooth of the pawl and the teeth of the rack to prevent movement of the pedal arm in the releasing direction;

wherein the spring is arranged such that the shifting of the pawl in the setting direction responsively causes the spring to move along the surface to a second orientation with the second end engaged with the second stop;

wherein the spring in the second orientation is arranged to bias the pawl in the disengaging direction such that further movement of the pedal arm in the brake applying direction enables the tooth of the pawl to disengage from the teeth of the rack for movement of the pawl in the disengaging direction, thereby enabling the pedal arm to move in the brake releasing direction to the fully released position; and wherein the pawl is arranged to responsively shift back in the resetting direction and the spring responsively moves back to the first orientation to bias the pawl to pivot in the engaging direction as the pedal arm moves to the fully released position.

2. The brake actuating assembly of claim 1, wherein the spring is a torsion spring.

3. The brake actuating assembly of claim 1, wherein the opening comprises a triangle.

4. The brake actuating assembly of claim 1, wherein the opening comprises a rectangle.

5. The brake actuating assembly of claim 1, wherein the opening comprises a square.

6. The brake actuating assembly of claim 1, wherein the opening comprises a polygon.

7. The brake actuating assembly of claim 1, wherein the opening comprises a semi-circle.

8. The brake actuating assembly of claim 1, wherein the opening comprises a slot.

9. The brake actuating assembly of claim 1, further comprising a stop operatively connected to the pedal arm, the stop being configured to engage the pawl as the pedal arm moves to the fully released position, thereby causing the pawl to responsively shift back in the resetting direction and the spring to responsively move back to the first orientation to bias the pawl to pivot in the engaging direction.

10. The brake actuating assembly of claim 9, wherein the stop is mounted to the arcuate rack of teeth.

11. The brake actuating assembly of claim 9, wherein the stop is integrally formed with the arcuate rack of teeth.

12. A vehicle with a brake system and a brake actuating assembly, the brake actuating assembly comprising:

a mounting bracket for mounting the brake actuating assembly to the vehicle;

a pedal arm mounted to the mounting bracket for pivotal movement about a pivot axis, the pedal arm having pedal pad on a distal end thereof away from the pivot axis, the pedal pad being configured to be engaged by a person's foot, the pedal arm connected to the brake system of the vehicle such that movement of the pedal arm in a brake applying direction activates the brake system and movement of the pedal arm in a brake releasing direction de-activates the brake system, with the brake system biasing the pedal arm in the brake releasing direction;

an arcuate rack of teeth connected to the pedal arm;

a pawl including a single tooth that is configured to engage the rack, the pawl being mounted for both (a) pivotal movements in engaging and disengaging directions and (b) translational shifting movements in setting and resetting directions; and a spring having a first end and a second end, the first end being operatively connected to the pawl, and the second end being operatively connected to the mounting bracket in an opening that includes a surface extending between a first stop and a second stop, wherein the spring is arranged such that in a first orientation the spring has the second end engaged with the first stop to bias the pawl to pivot in the engaging direction, and wherein the spring is arranged in its first orientation as the pedal arm is being moved from a fully released position in the brake applying direction to thereby bias the pawl in the engaging direction and maintain the tooth of the pawl in a ratcheting engagement with the teeth of the rack;

wherein the pawl is arranged to shift in the setting direction after ceasing movement of the pedal arm in the brake applying direction as a result of the pedal arm being biased in the brake releasing direction and applying force to the pawl in the setting direction by the engagement between the pawl and the teeth of the rack, the force being applied to the pawl in the setting direction also maintaining the engagement between the tooth of the pawl and the teeth of the rack to prevent movement of the pedal arm in the releasing direction;

wherein the spring is arranged such that the shifting of the pawl in the setting direction responsively causes the spring to move along the surface to a second orientation with the second end engaged with the second stop;

wherein the spring in the second orientation is arranged to bias the pawl in the disengaging direction such that further movement of the pedal arm in the brake applying direction enables the tooth of the pawl to disengage from the teeth of the rack for movement of the pawl in the disengaging direction, thereby enabling the pedal arm to move in the brake releasing direction to the fully released position; and wherein the pawl is arranged to responsively shift back in the resetting direction and the spring responsively moves back to the first orientation to bias the pawl to pivot in the engaging direction as the pedal arm moves to the fully released position.

13. The vehicle of claim 12, wherein the spring is a torsion spring.

14. The vehicle of claim 12, wherein the opening comprises a triangle.

15. The vehicle of claim 12, wherein the opening comprises a rectangle.

16. The vehicle of claim 12, wherein the opening comprises a square.

17. The vehicle of claim 12, wherein the opening comprises a polygon.

18. The vehicle of claim 12, wherein the opening comprises a semi-circle.

19. The vehicle of claim 12, wherein the opening comprises a slot.

20. The vehicle of claim 12, wherein the brake actuating assembly further comprises a stop operatively connected to the pedal arm, the stop being configured to engage the pawl as the pedal arm moves to the fully released position, thereby causing the pawl to responsively shift back in the resetting direction and the spring to responsively move back to the first orientation to bias the pawl to pivot in the engaging direction.

21. The vehicle of claim 20, wherein the stop is mounted to the arcuate rack of teeth.

22. The vehicle of claim 20, wherein the stop is integrally formed with the arcuate rack of teeth.

* * * * *